Dec. 22, 1942.   A. FRANZ   2,305,765
EXHAUST CONDUIT COWLING
Filed July 6, 1939   2 Sheets-Sheet 1

Inventor
ANSELM FRANZ
By Bailey, Stephens & Huettig
Attorneys.

Dec. 22, 1942.   A. FRANZ   2,305,765
EXHAUST CONDUIT COWLING
Filed July 6, 1939   2 Sheets-Sheet 2

Inventor.
ANSELM FRANZ
By Bailey, Stephens & Huettig
Attorneys.

Patented Dec. 22, 1942

2,305,765

UNITED STATES PATENT OFFICE 2,305,765

EXHAUST CONDUIT COWLING

Anselm Franz, Dessau, Germany; vested in the Alien Property Custodian

Application July 6, 1939, Serial No. 283,100
In Germany July 9, 1938

10 Claims. (Cl. 60—35.6)

This invention is directed to a cowling for exhaust conduits, and particularly for exhaust conduits which are in the form of individual nozzles extending rearwardly from each cylinder of the engine for the purpose of aiding in the forward propulsion of the engine because of the recoil action taking place from gas escaping from the exhaust conduits.

In such devices the exhaust conduits are of very short length and are partially contained within the outer cover of the aircraft in order to reduce the frontal resistance of the aircraft. As the exhaust nozzles thus project but a very small distance outwardly of the aircraft, the gases exhausted toward the rear of the aircraft are so close to the body of the aircraft as to wash the aircraft covering. Because of the very short length and the nozzle form of the exhaust conduits, the gases emitted from the nozzles are extremely hot and corrosive, thus being destructive of the aircraft covering and causing the possibility of noxious gases entering into the cabin of the aircraft where they would endanger the health of the occupants of the aircraft.

It is an object of the invention to provide a cowling for the individual exhaust conduits to prevent the exhaust gases therefrom contacting the wall of the aircraft.

Another object of the invention is to construct a cowling for the individual conduits which will provide a streamlined surface for the conduits, thus lowering the frontal resistance thereof.

A further object of the invention is to construct a streamlined cowling for the exhaust conduits of an aircraft which will provide a layer of air between the exhaust gases and the body of the aircraft.

A further object of the invention is to provide a cowling which separates the opening in the covering of the aircraft through which the conduits project, from the interior of the aircraft, and the adjacent portions of the covering by an insulating stream of air.

Generally these objects of the invention are obtained by providing a streamlined cowling partially enclosing the portions of the conduits projecting outwardly of the covering which separates the stream of air passing by the exhaust conduits, and causes this stream of air to come together rearwardly of the last conduit in a row of conduits, and thus form a layer of air between the exhaust gases emitted by the conduits and the body of the aircraft. By using a double wall cowling, the stream of air can be directed between the walls in order to insulate the conduits from the remainder of the aircraft.

These and other objects of the invention are obtained by the construction described in the following specification, taken in connection with the drawings, in which.

Figure 1:
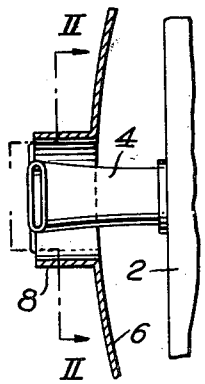
Fig. 1 is a cross-sectional view of one form of cowling taken on the line I—I of Fig. 2.
Figure 2:
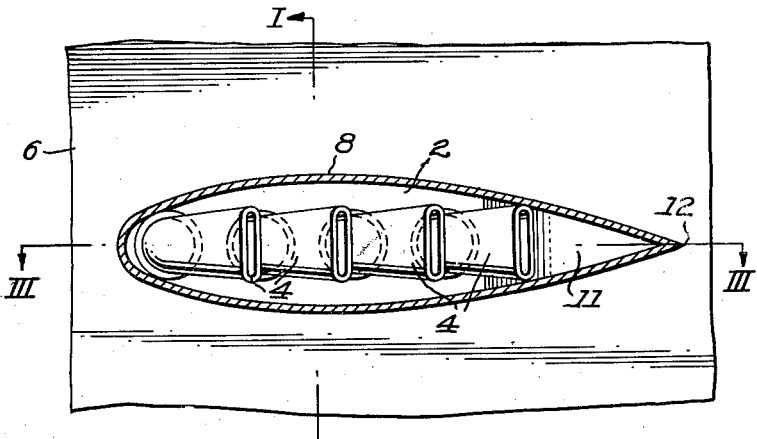
Fig. 2 is a side sectional view on the line II—II of Fig. 1.
Figure 3:
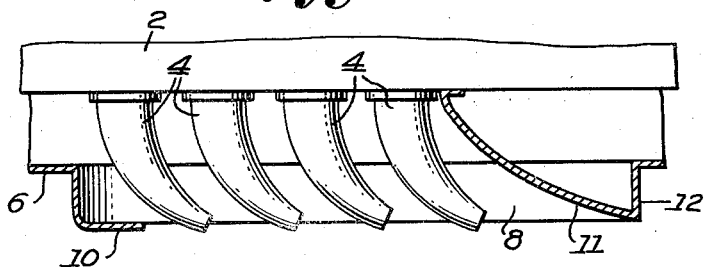
Fig. 3 is a cross sectional view on the line III—III of Fig. 2.
Figure 4:
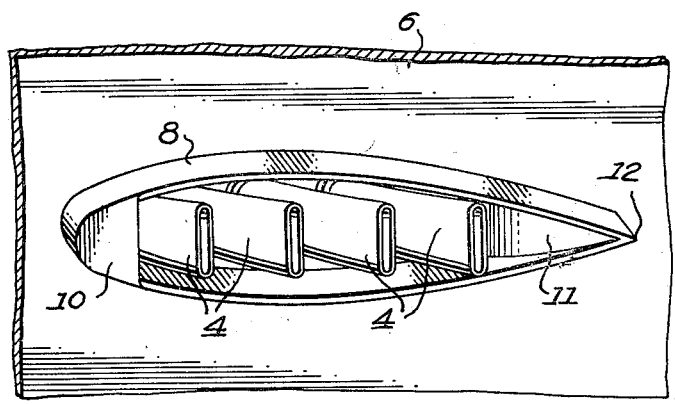
Fig. 4 is a side perspective view of the cowling covering the exhaust conduits.
Figure 5:
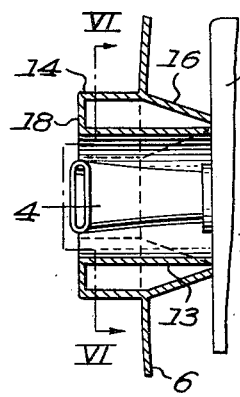
Fig. 5 is a view similar to Fig. 1 showing a modified form of cowling.
Figure 6:
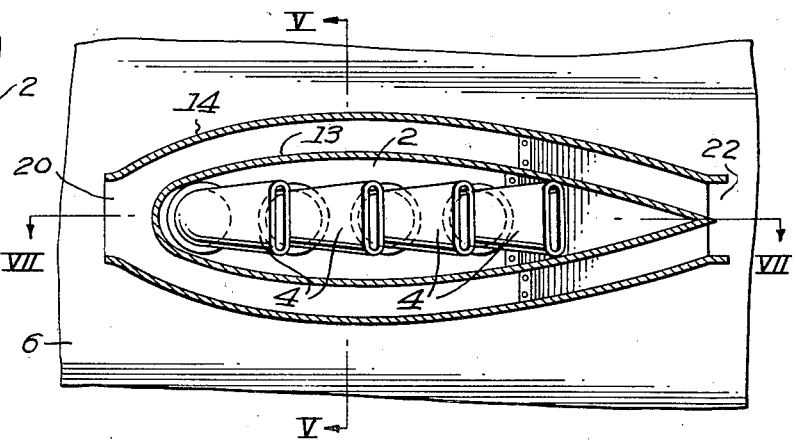
Fig. 6 is a side sectional view on the line VI—VI of Fig. 5.
Figure 7:
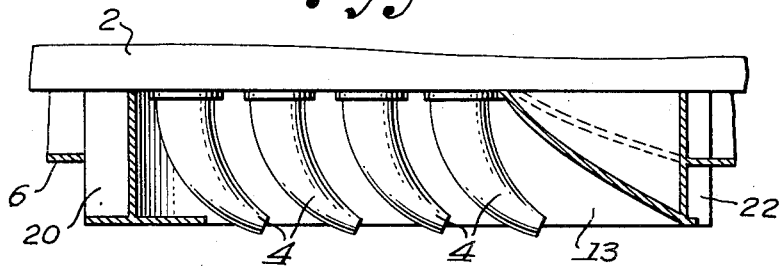
Fig. 7 is a cross sectional view on the line VII—VII of Fig. 6.
Figure 8:
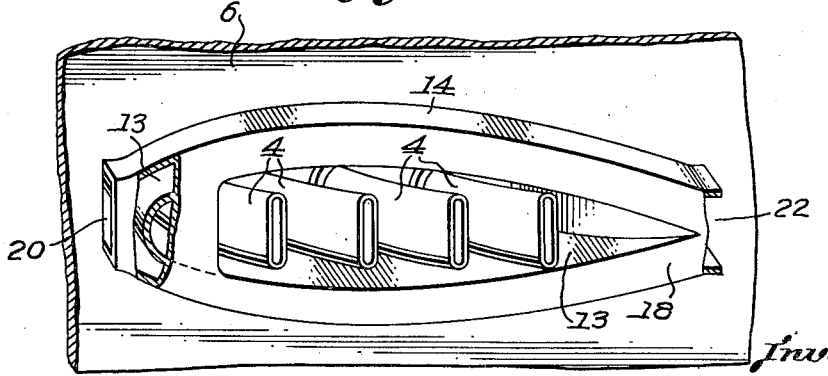
Fig. 8 is a view similar to Fig. 2, but showing the modified cowling of Fig. 3.

In Figs. 1 to 4, the aircraft engine block is shown at 2 from which individual exhaust nozzles 4 extend from each cylinder. These conduits are curved toward the rear of the aircraft and are constructed as nozzles which, in the discharge of the exhaust gases, produce a recoil action which aids in the forward propulsion of the aircraft. The engine cowling, or covering of the aircraft, 6 is provided with an opening through which the individual nozzles 4 project. A cowling 8 partially encloses the projecting portions of the conduit 4. Cowling 8 has the tapered shape of an airfoil from its nose 10 to the trailing edge 12. The outer portion of this cowling 8 is open, and the cowling has a height substantially equal to the distance the individual nozzles project from the covering 6, so that the outward end of each nozzle lies in substantially the same plane as the outer edge of cowling 8, as shown in Fig. 1. Adjacent the trailing edge 12 of cowling 8 is an inclined wall 11.

It is clear from the description of this structure that gases emitted from the exhaust nozzles 4 are discharged rearwardly in a path substantially parallel to the covering 6 and would normally tend to wash the side of the aircraft. However, the air stream striking the nose 10 of cowling 8 is split and passes along opposite sides of cowling 8 to the trailing edge 12, where the two streams of air are united to form a layer of air which lies between the exhaust gases emitted from nozzles 4 and the covering of the aircraft. This construction not only protects the body of the aircraft, but provides a lessened frontal resistance for the portions of the conduits 4 projecting outwardly of covering 6.

In Figs. 5 to 8, a modified construction is shown in which the cowling insulates the exhaust conduits from the remainder of the aircraft. The exhaust conduits 4 again extend from engine block 2 and project outwardly of the engine cowling or surface covering 6 of the aircraft. A cowling 13, streamlined in shape, encloses the conduits 4 in a manner similar to the cowling 8 of Figs. 1 and 2, except that the cowling 13 extends from the engine block rather than merely from the outer surface of the aircraft. A second cowling or jacket 14 is spaced from and encloses cowling 13. Such closing is effected by a wall 16 extending from the inner side of covering 6 to the engine block, and a flanged outer portion 18 extending between the outer edge of jacket 14 and the outer end of cowling 13. The outer cowling 14 has an opening 20 at its leading edge and an opening 22 at its rear edge. In this construction air is not only passed outwardly of cowling 14 to form a layer of air between the covering of the aircraft and the exhaust gases emitted by nozzles 4, but air is also forced through opening 20 between cowlings 13 and 14 and discharged through opening 22. The construction of Figs. 5 to 8 has the advantage that the exhaust conduits 4 are separated from the interior of the aircraft by walls 13 and 16, with cooling air passing between these walls. Thus heat from conduits 4, and any leakage therefrom is prevented from entering into the interior of the aircraft.

By the constructions described, the problem of preventing the extremely hot gases emitted by the recoil nozzles from injuring the covering of the aircraft, or entering into the interior of the aircraft, is solved, while at the same time the frontal resistance of the aircraft is reduced. The cowling construction of Figs. 5 to 8 provides the additional very desirable advantage of insulating the exhaust conduits from the interior of the aircraft.

Having now described a means by which the objects of this invention may be obtained, what I claim as new and desire to secure by Letters Patent is:

1. In an aircraft having individual exhaust conduits projecting outwardly of the covering of the aircraft, a cowling extending from the aircraft covering and surrounding the projecting portions of said conduits while being open on one side so that said conduits individually exhaust into the atmosphere, said cowling extending about said conduits and terminating rearwardly of the conduits and being curved to direct air around said cowling to form rearwardly of said conduits a layer of air between the exhaust gases emitted from said conduits and the covering of the aircraft.

2. In an aircraft as in claim 1, said cowling being in the shape of an airfoil.

3. In an aircraft having exhaust conduits projecting outwardly of the covering of the aircraft and being formed as recoil exhaust nozzles emitting exhaust gases rearwardly along the body of the aircraft, a cowling partially enclosing the portions of said conduits projecting outwardly of said covering, said cowling comprising a curved nose portion secured to said covering forwardly of said conduits, and two curved walls having a height substantially equal to the distance said conduits project from said covering, said walls being secured to said covering and being curved from said nose to a mutual joint rearwardly of said conduits.

4. A cowling construction for exhaust conduits projecting from an engine block outwardly of an aircraft covering comprising a first cowling partially enclosing said conduits and extending from said block outwardly a distance equal to the outward extent of said conduits, a second cowling spaced from said first cowling and connected to said first cowling to form an air passageway therebetween, openings in the forward and rearward ends, respectively, of said second cowling whereby cooling air circulates between said first and second cowlings.

5. A cowling construction as in claim 4, said second cowling having the shape of an airfoil whereby a layer of air is formed between the gases emitted by said conduit and the covering of the aircraft.

6. A cowling construction for exhaust conduits of an aircraft engine, said conduits projecting outwardly of the covering of the aircraft and being in the form of nozzles directed rearwardly of the aircraft for producing a recoil action, said construction comprising means for separating the relative air stream for by-passing the conduits and for uniting the air stream rearwardly of the conduits to form a layer of air between the gases emitted by the conduit and the covering of the aircraft, and means for directing a part of the relative air stream between said conduits and the interior of said aircraft to form insulating means therebetween.

7. A cowling construction for substantially linearly aligned individual exhaust conduits of an aircraft engine, said conduits projecting from the engine block outwardly of the covering of the aircraft and being in the form of nozzles directed rearwardly of the aircraft for producing a recoil action, comprising a member of substantially airfoil section forming a wall surrounding the projecting portions of said conduits, said member having a tapered trailing edge, whereby a layer of air produced by the relative wind insulates the covering of the aircraft from gases exhausted from said conduits, and a baffle extending from said block adjacent the rearmost conduit to the outer edge of said member on the apex of said trailing edge.

8. A cowling construction as in claim 7 in which said wall extends from the engine block to a plane intersecting the outer ends of said conduits.

9. In a vehicle having an internal combustion engine enclosed within a covering, and an exhaust conduit projecting through said covering with its outlet end directed rearwardly of the direction of travel of said vehicle; a cowling extending from said covering and having an opening through which the exhaust gases from said conduit discharge directly into the atmosphere, said cowling being curved in a streamlined form from a point forwardly of the outlet end of said conduit to a point rearwardly thereof to direct air around said cowling to form rearwardly of said conduit a layer of air between the exhaust gases emitted from said conduit and said covering.

10. In an aircraft having a plurality of exhaust conduits projecting outwardly of the covering of the aircraft and having their discharge ends directed rearwardly of the direction of travel of said aircraft so that the exhaust gases issuing therefrom produce a reaction propulsion force, a cowling faired from the aircraft covering and surrounding the projecting portions of said conduits while being opened on one side so that said conduits individually exhaust into the atmosphere, said cowling extending about said conduits and terminating rearwardly thereof and being curved to direct air around said cowling to form rearwardly of said conduits a layer of air between the exhaust gases emitted from said conduits and the covering of the aircraft.

ANSELM FRANZ.